Feb. 24, 1942.   A. J. NIELSEN ET AL   2,274,156
BELL ATTACHMENT FOR VEHICLE WHEELS
Filed March 27, 1940   2 Sheets-Sheet 1
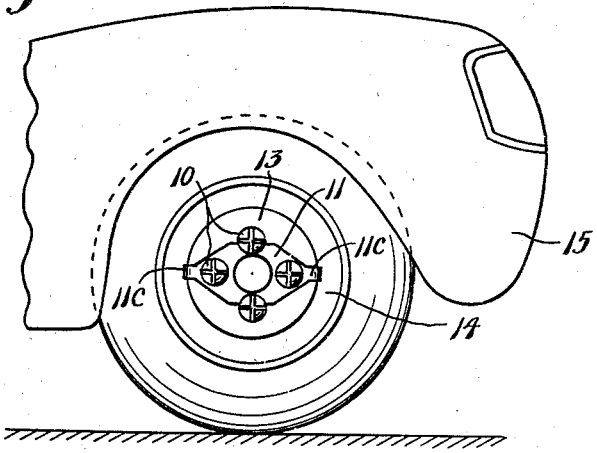
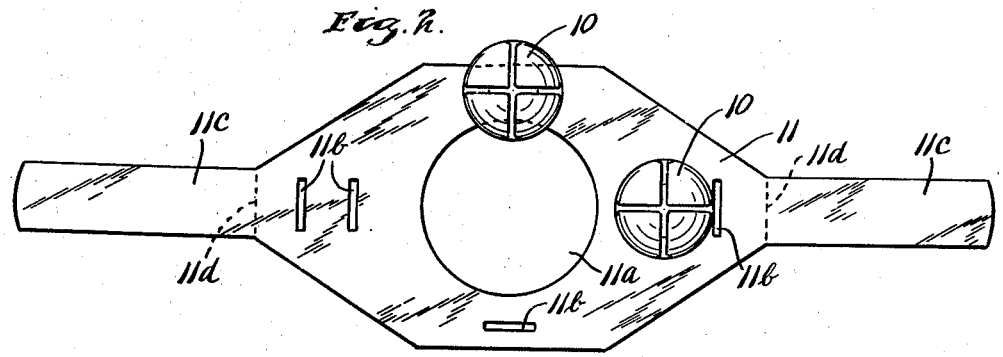
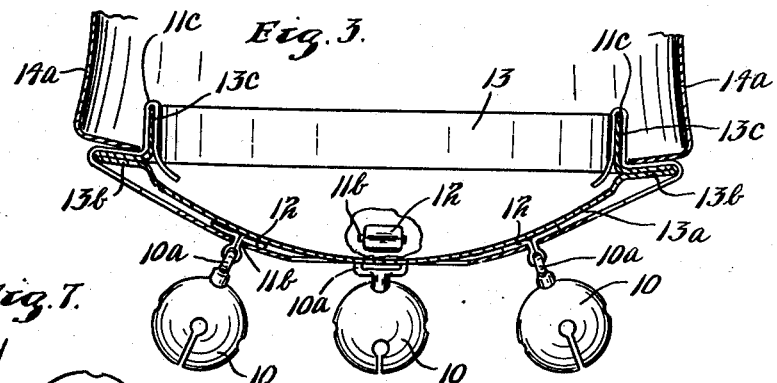
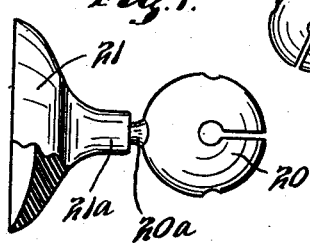
INVENTORS
ALFRED J. NIELSEN.
EDWIN ELIASON.
BY THEIR ATTORNEYS.
Williamson & Williamson Feb. 24, 1942.  A. J. NIELSEN ET AL  2,274,156
BELL ATTACHMENT FOR VEHICLE WHEELS
Filed March 27, 1940  2 Sheets-Sheet 2
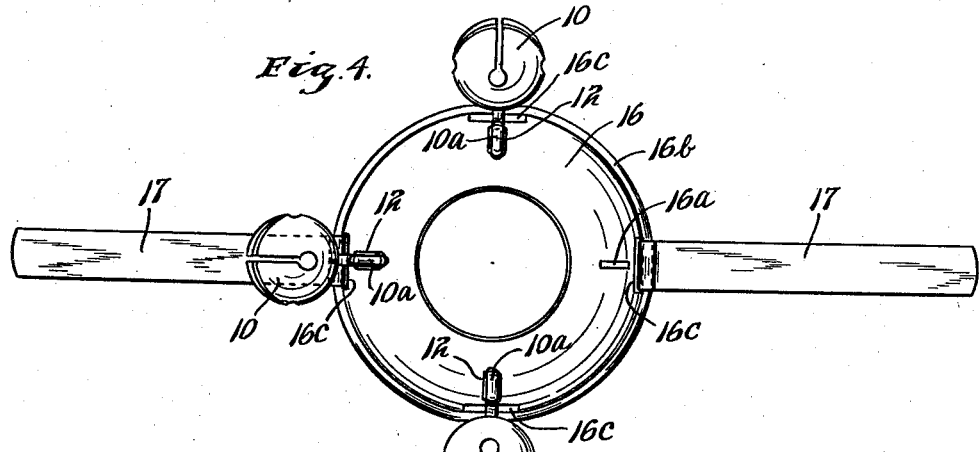
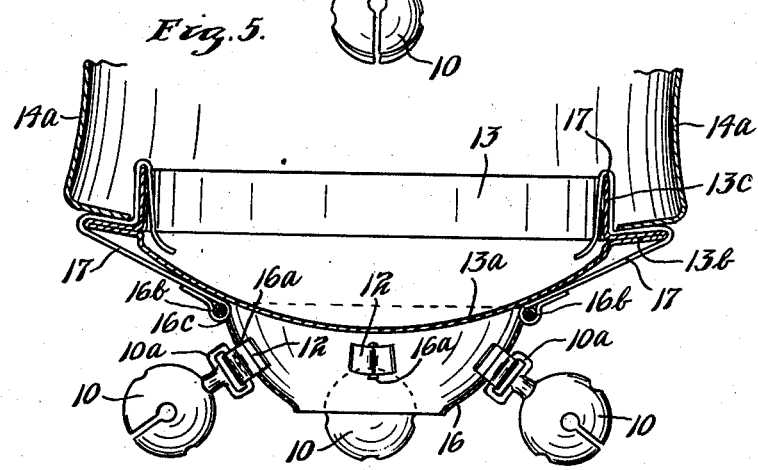
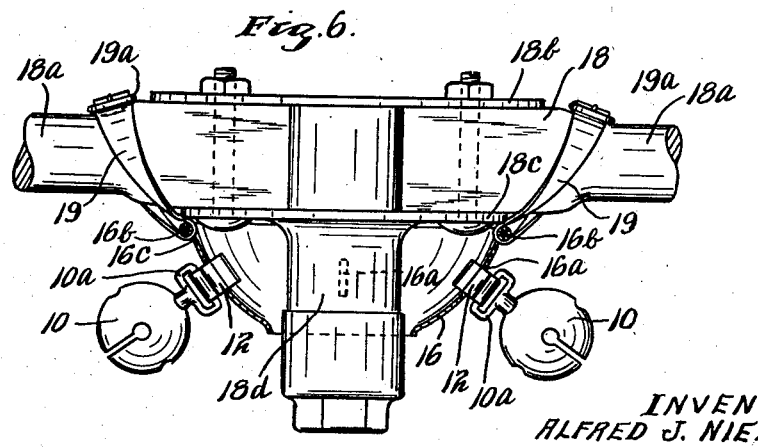
INVENTORS.
ALFRED J. NIELSEN.
EDWIN ELIASON.
BY THEIR ATTORNEYS.
Williamson & Williamson Patented Feb. 24, 1942

2,274,156

UNITED STATES PATENT OFFICE 2,274,156

BELL ATTACHMENT FOR VEHICLE WHEELS

Alfred J. Nielsen and Edwin Eliason, Luck, Wis.

Application March 27, 1940, Serial No. 326,262

5 Claims. (Cl. 116—170)

Our invention relates to sound-producing devices and particularly to a bell attachment for wheeled vehicles.

When vehicles are used in parades, in connection with winter sports activities or for other purposes where pleasing sound effects are desired concurrent with operation of the vehicles it appears desirable that suitable apparatus be available for attachment to vehicles to produce sound effects when the vehicles are in operation.

An object of our invention is to provide an attachment for vehicles capable of effectively producing the sound of sleigh bells or the like responsive to operation of the vehicles to which the attachment is applied.

A more specific object is to provide a device attachable to a wheel of a vehicle and including suitable bells incorporated in the device in such a manner that the bells will operate responsive to rotation of the wheel to which the device is attached.

Another object is to provide such a device which may be attached to and removed from a wheel quickly and easily and as a unit.

Still another object is to provide such a device which may be associated with the central portion of a wheel in snugly fitting and compact relation therewith.

Yet another object is to provide such a device including means of attachment to a vehicle wheel of such a nature as to obviate the need for modifying or marring the wheel in any way in the process of attaching the device.

A further object is to provide such a device of light, simple, compact and inexpensive construction.

These and other objects and advantages of the invention will more fully appear from the following description made in connection with the accompanying drawings, wherein like reference characters refer to the same parts throughout the views, and, in which:

Fig. 1 is a general view of an embodiment of our invention shown in operative association with a front wheel of a motor vehicle;

Fig. 2 is a front view of the embodiment of Fig. 1 with certain of the bells of the device removed;

Fig. 3 is a partially sectional, partially broken away view of a motor vehicle wheel hub with the device of Fig. 2 operatively associated therewith;

Fig. 4 is a front view of another embodiment of our invention with one of the bells thereof removed;

Fig. 5 is a sectional view of a motor vehicle wheel hub with the device of Fig. 4 operatively associated therewith;

Fig. 6 is a sectional view of an old type of motor vehicle wheel hub with a modification of the device of Figs. 4 and 5 operatively associated therewith; and Fig. 7 is a partially broken away and sectional side view of still another embodiment of our invention.

Referring to the drawings, and particularly to Figs. 1 to 3 inclusive, the embodiment of our invention shown in these views includes a plurality of bells 10 swingably attached to a bell-supporting member 11 which is attachable to the hub portion of a motor vehicle. While the bells 10 may be of any one of a number of types, we prefer them to be of the well known type ordinarily referred to as sleigh-bells and have so shown them in the drawings.

While the bell-supporting member 11 may be of various shapes, we have shown the same, as will be seen in Fig. 2, as being of elongated octagon shape. Preferably the member 11 is formed of sheet metal and an opening 11a is provided in the central portion thereof. For the sake of economy the member 11 may be made of canvas or the like if desired.

A plurality of the bells 10 are swingably connected to the front side of the member 11 at respective points disposed symmetrically thereof. For this purpose the member 11 is provided, at such points, with slots 11b which may be disposed either radially of the center of the member 11 or tangent to circles concentric with the center of the member 11, the latter disposition of the slots 11b being shown in Fig. 2. In accordance with common practice the bells 10 are each provided with an attachment loop or ring 10a as shown in Fig. 3. Clips 12, comprising flat strips of bendable but relatively rigid material such as sheet metal, are extended through the bell attachment rings 10a and are bent upon themselves to each have a pair of parallel legs as indicated in Fig. 3. The parallel legs of each clip 12 are projected through a corresponding one of the slots 11b and are spread apart, as indicated in Fig. 3, at the rear side of the member 11 to swingably connect a corresponding one of the bells 10 to the member 11. As shown in Fig. 2, extra slots 11b are provided in the left and right hand portions of the member 11 so that two choices are available as to the distance from the center of the member 11 at which the left and right hand bells may be attached to the member 11, or, with the portions 11c omitted beyond the dotted lines 11d, straps may be extended through the outer slots 11b.

Preferably the bell-supporting member 11 is bent to somewhat dished form so as to approximately fit the convex contour of the usual type of modern hub cap.

Means is provided for attaching the member 11 to the central portion of a motor vehicle wheel in concentric relation therewith. The attachment means shown in Figs. 1 to 3 inclusive is designed for use with the usual large type of modern hub cap which is pressed or snapped into place in the hub portion of the wheel of a motor vehicle. As illustrated in Fig. 3, this type of hub cap is referred to by the numeral 13 and includes an exteriorly convex main portion 13a, a generally radially projecting annular flange 13b normally bearing against an annular portion 14a of the hub of a vehicle wheel 14, and an axially projecting annular flange 13c which normally projects into the interior space of the wheel hub portion 14a and is secured therein by suitable retaining means. For attachment of the member 11 to a hub cap such as the hub cap 13 we provide tongues or bands 11c formed integrally with the member 11 and projecting generally radially outwardly of respective portions of the edge thereof as shown in Fig. 2. While various numbers of the tongues 11c might be provided on the member 11, we consider that two tongues 11c projecting from opposite ends of the member 11, as shown, will ordinarily be sufficient. In use of the attachment tongues 11, the same are bent around the flanges 13b and 13c to conform to the shape thereof, as indicated in Fig. 3, after which the hub cap 13 may be snapped into place in the hub portion 14a. It should be apparent that, after this has been done, the bell-supporting member 11 is securely attached to the central portion of the wheel 14 in concentric or symmetrical relation therewith. It should also be apparent that the bells 10 will then ring responsive to rotation of the wheel 14 (see Fig. 1). The front portion of a motor vehicle, including the right front wheel 14 and fender 15, is illustrated in Fig. 1.

In Figs. 4 and 5 we illustrate a somewhat different embodiment of our invention which is also attachable to a hub cap such as the hub cap 13 of Figs. 1 to 3. The bell-supporting member 16 of Figs. 4 and 5 is of centrally apertured cup-shape, as can be best seen in Fig. 5, so as to be capable of bearing, at its marginal edge, against the exterior side of the exteriorly convex main portion 13a of a hub cap 13 as indicated in Fig. 5. The bell-supporting member 16 is provided with an annularly extending series of slots 16a similar to the slots 11b of Figs. 1 to 3 and by means of which bells 10 are swingably connected to the member 16 with clips 12 in the same manner as the bells 10 were attached to the slotted portions of the bell-supporting member 11 of Figs. 1 to 3.

Means is provided for attaching the bell-supporting member 16 to a hub cap such as the hub cap 13. The member 16 is provided, at its peripheral edge, with an annular bead 16b and, at respective points along the periphery thereof is provided, immediately inwardly of the bead 16b, with slots 16c disposed parallel to portions of the bead 16b whereby such portions of the bead 16b constitute pivot pins in effect. Any desired number of equally or unequally spaced slots 16c may be provided as desired but we have shown, as appears best in Fig. 4, four equally spaced slots 16c so that four corresponding portions of the bead 16b are available as pivot pins. Bands 17 of flat, bendable material such as sheet metal are placed in radially outwardly projecting relation with the periphery of the member 16 at points where slots 16c render the bead 16b useable as pivot pins, and the inner ends of the bands 17 are bent about the corresponding pivot pin portions of the bead 16b so as to be pivotally connected therewith and swingable relative to the member 16. As indicated in Fig. 5, the bands 17 may be bent about the flanges 13b and 13c of the hub cap 13 in the same manner as the bands 11c of Figs. 1 to 3 after which the hub cap 13 may be placed in normal relation with the hub portion 14a of the vehicle wheel 14. It should be apparent that, when this has been done, the bells 10 will operate in the same manner as in the device of Figs. 1 to 3.

In Fig. 6 we show a modified form of the device of Figs. 4 and 5 which is particularly adapted for use with motor vehicle wheels of an older type usually referred to as artillery type wheels. In Fig. 6 the central portion of a wheel 18 of this type is shown having spokes 18a held at their inner ends between hub plates 18b and 18c which form part of a hub assembly including an outwardly projecting capped hub body 18d of small diameter relative to the corresponding parts of present day types of motor vehicle wheel hubs.

In the form of our device shown in Fig. 6 the same parts are used as in the form of Figs. 4 and 5 with the exception that the bands 17 are omitted and other attachment means is substituted therefor. The peripheral edge of our device of Fig. 6 bears against the outer spoke-retaining hub flange 18c and the apertured central portion of the bell-supporting member 16 accommodates projection therethrough of the hub body 18d of the wheel 18. Suitable flexible straps 19, preferably equipped with ordinary buckles 19a, are extended through the slots 16c of the bell-supporting member 16 and, as indicated in Fig. 6, may be buckled in encircling relation with suitable ones of the wheel spokes 18a to secure the device to the wheel 18 in concentric relation therewith.

In Fig. 7 we illustrate another form of our device in which a bell 20, having an attachment shank 20a, is connected, by means of the shank 20a to the neck portion 21a of a rubber vacuum cup 21 of well known form. It should be apparent that the vacuum cup 21 may be placed in attached relation with any surface presented by parts of a vehicle wheel and that such surfaces may be situated either concentrically or eccentrically relative to the vehicle wheel. In suitable manners the bell shank 20a may be connected to the neck 21a of the vacuum cup 21 in either fixed or swingable relation therewith.

It is apparent that we have invented a novel, effective, compact, simple, light and inexpensive bell device quickly and easily attachable to and removable from the wheel of a vehicle and capable of operating responsive to rotation of the wheel to produce a pleasing jingling sound.

It will, of course, be understood that various changes may be made in the form, details, arrangement and proportions of the various parts without departing from the scope of our invention.

What is claimed is:

1. A noise-making device for wheeled vehicles comprising, a bell-supporting member of generally cup-shaped form to fit against the outer side of the hub portion of a vehicle wheel in concentric relation therewith, bands of bendable but relatively rigid material swingably connected to and extending generally outwardly of respective points on the marginal portion of said member for use in attaching said member to a wheel in said relation therewith, and a plurality of bells connected to said member at symmetrically disposed respective points thereon.

2. In combination with a vehicle wheel having a hub provided with a telescoping, detachable hub cap, a bell attachment comprising a bell supporting member constructed to fit against the outer face of said hub cap, a plurality of flexible retaining members extending outwardly from said supporting member and interposed between the telescoping portions of said hub and hub cap for securing said bell supporting member and at least one bell connected with said supporting member.

3. In combination with a vehicle wheel having a hub provided with a telescoping, detachable hub cap, a bell attachment comprising a bell supporting member constructed to fit against the outer face of said hub cap, at least one bell connected with said supporting member, and flexible retaining means extending outwardly from said supporting member and interposed between the telescoping portions of said hub and hub cap for securing said bell supporting member.

4. In combination with a vehicle wheel having a hub provided with a telescoping, detachable hub cap, a bell attachment comprising a bell supporting member constructed to fit against the outer face of said hub cap, said supporting member having a central aperture exposing at least a portion of said hub cap, at least one bell connected with the outer side of said supporting member, a plurality of relatively narrow, flexible retaining members extending outwardly from said supporting member and adapted to be interposed between the telescoping portions of said hub and hub cap for securing said bell supporting member.

5. In combination with a vehicle wheel having a hub provided with a telescoping, detachable hub cap, a bell attachment comprising an integrally formed member constructed of flexible sheet material, said member forming a central bell supporting element constructed to fit against the outer face of said hub cap and forming also a plurality of flexible retaining elements extending outwardly from said supporting element and adapted to be interposed between the telescoping portions of said hub and hub cap for securing said member, and at least one bell connected with said supporting element.

ALFRED J. NIELSEN.
EDWIN ELIASON.